March 31, 1964  M. M. HANN ET AL  3,126,707

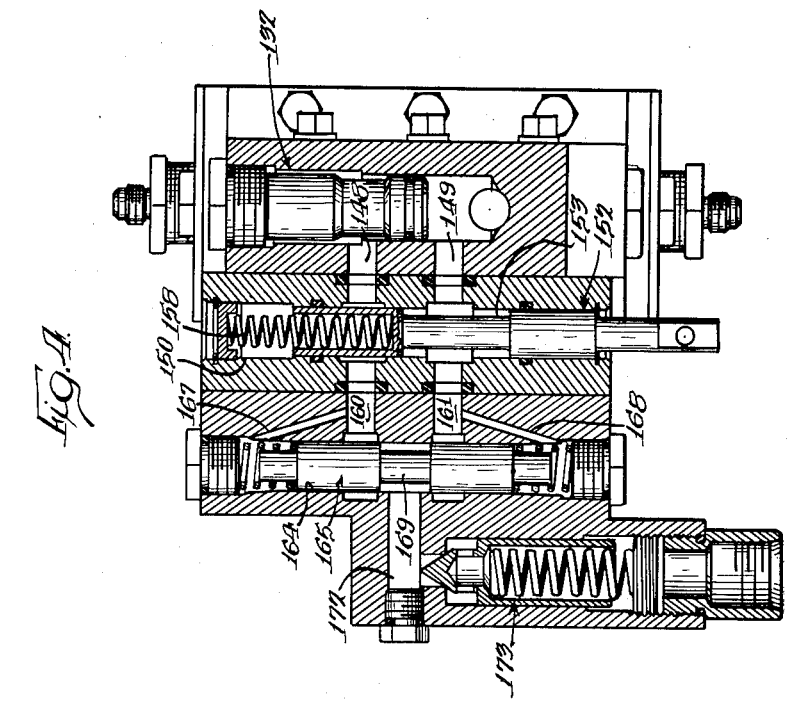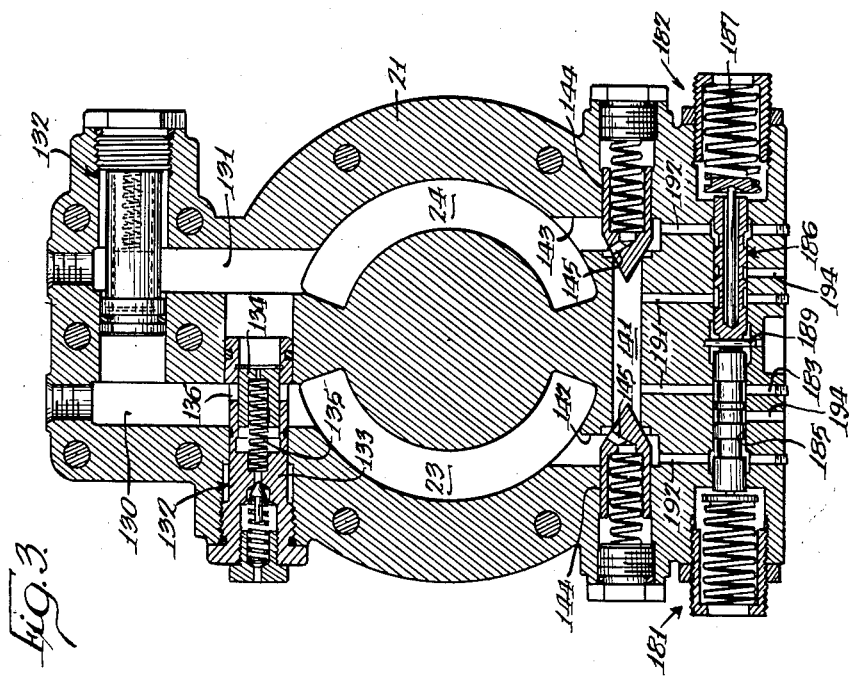

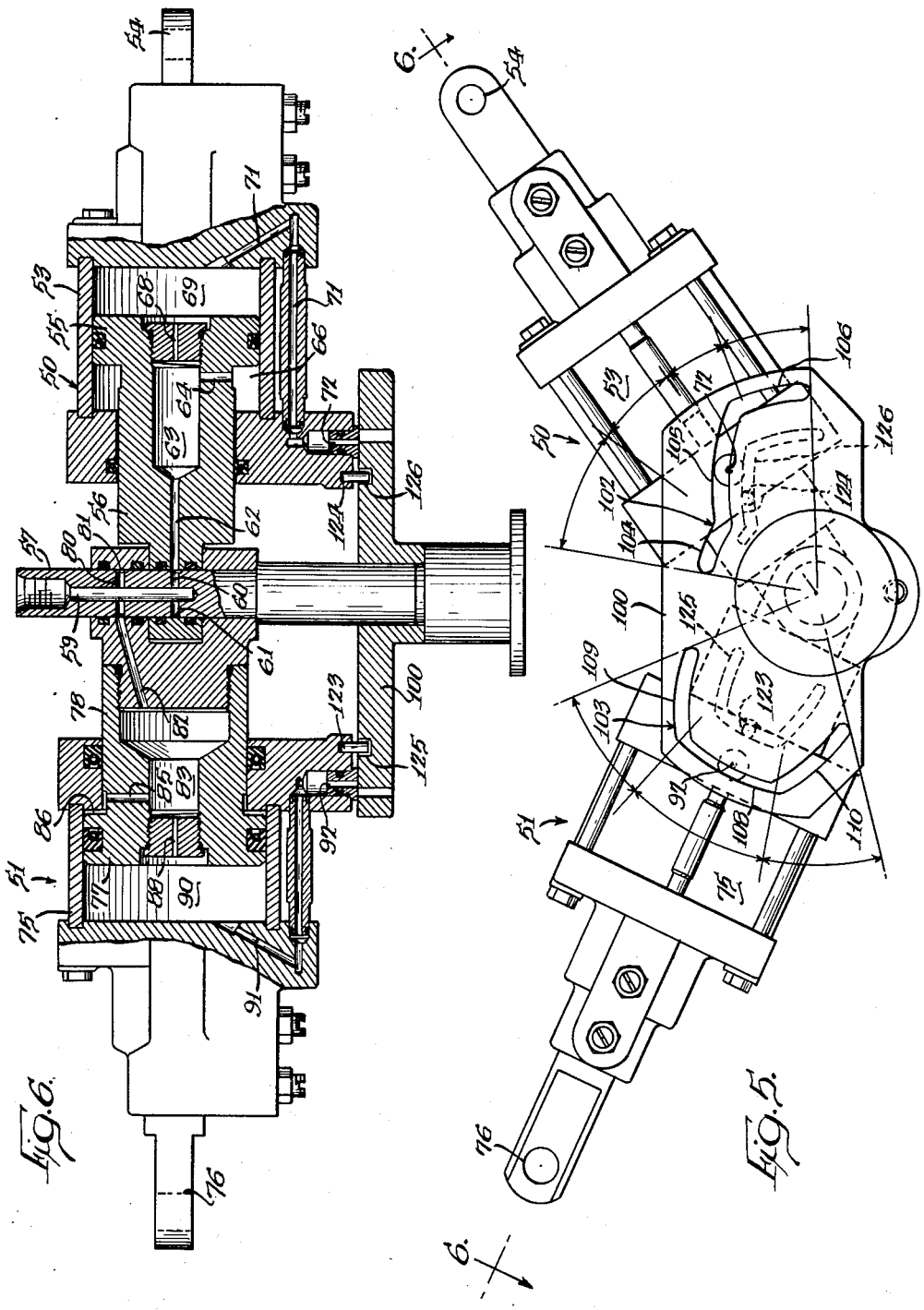

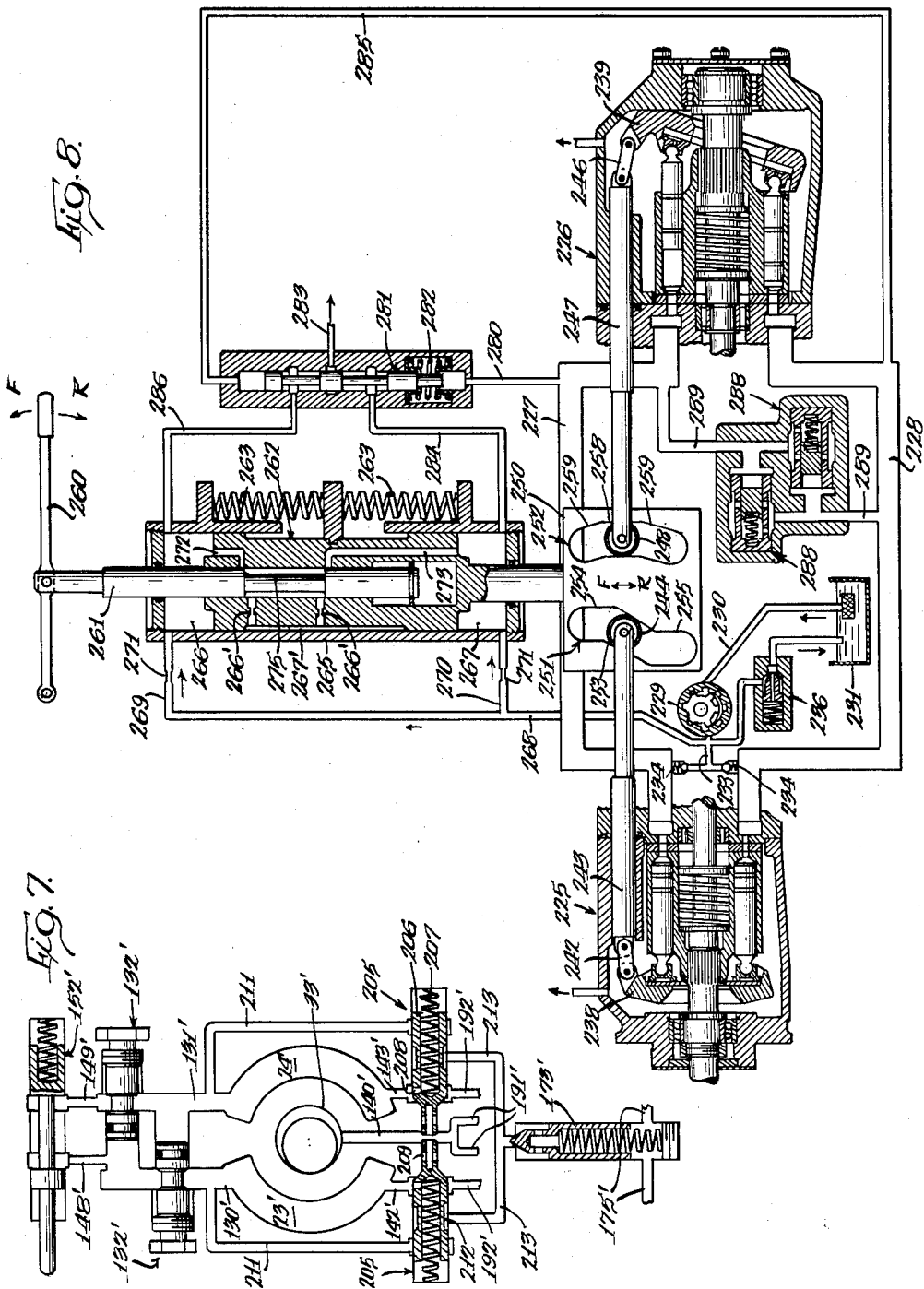

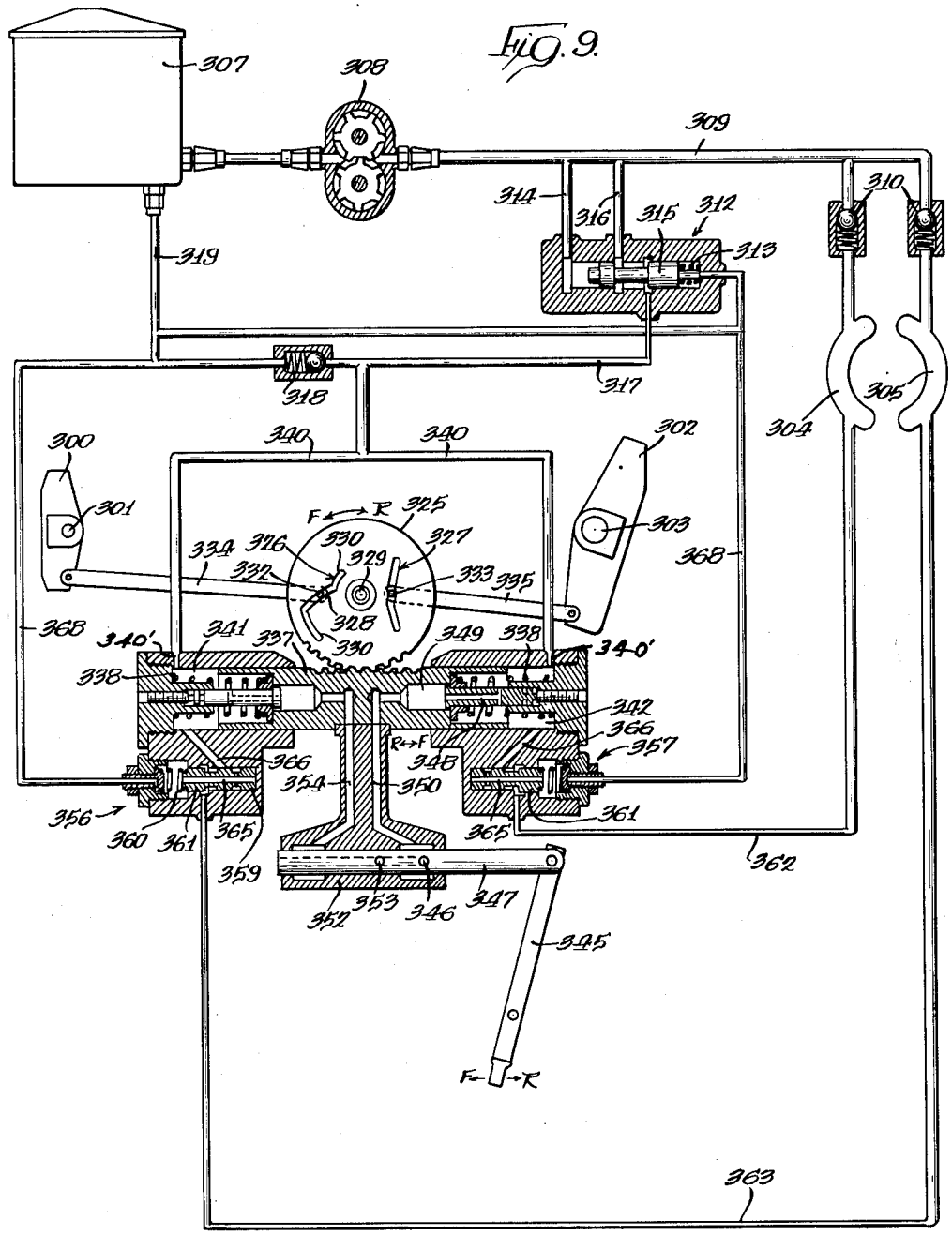

HYDROSTATIC TRANSMISSION

Filed March 13, 1961  8 Sheets-Sheet 8

United States Patent Office 3,126,707
Patented Mar. 31, 1964

3,126,707
HYDROSTATIC TRANSMISSION
Melvin M. Hann and Harry C. Moon, Jr., Rockford, Ill., assignors to Sundstrand Corporation, a corporation of Illinois
Filed Mar. 13, 1961, Ser. No. 95,078
47 Claims. (Cl. 60—53)

This invention relates to a hydraulic transmission for use in a vehicle such as a tractor.

It is a general object of the invention to provide a new and improved transmission of the type described.

A more specific object is to provide a new and improved hydraulic transmission including a variable displacement pump, a variable displacement motor, manually operable means for varying the displacement of the pump and the motor in order to control the speed of the transmission, and a control responsive to pressure in the circuit connecting the pump and motor for overriding the manual control and regulating the displacement of the pump and motor to modulate the pressure in the system.

Another object is to provide a new and improved overriding control responsive to pressure increase in the high pressure conduit connecting the pump and motor due to an increased load on the transmission while operating at high speed, for first increasing the displacement of the motor to increase the torque and then reducing the displacement of the pump if the increased load is not overcome, thereby to stall the transmission wtihout pumping fluid over a relief valve and incurring the coincident power loss.

A further object is to provide a new and improved overriding control responsive to pressure increase in the high pressure conduit connecting the pump and motor due to rapid movement of the manual control in bringing the transmission up to speed, for increasing pump displacement and then reducing motor displacement at a controlled rate to maintain constant the pressure in the high pressure conduit connecting the pump and the motor.

It is also an object of the invention to provide a new and improved overriding control in a hydraulic transmission responsive to pressure increase above a predetermined value in the low pressure conduit connecting the pump and motor due to rapid movement of the manual control in reducing the speed of the transmission, for first increasing the motor displacement and then reducing the pump displacement at a controlled rate so that pressure in the low pressure conduit does not exceed the predetermined value.

Another object is to provide a new and improved hydraulic transmission including a variable displacement pump, a variable displacement motor, a common cam means including separate cam portions for independently controlling displacement of the pump and displacement of the motor, and manually operable means for controlling the cam.

A further object is to provide a new and improved transmission of the type described in the preceding paragraph, wherein the controlling cam is formed with separate valving portions controlling separate piston and cylinder devices associated respectively with the displacement varying means of the pump and motor.

An additional object is to provide a new and improved transmission of the character mentioned in the second paragraph above, wherein the cam includes separate cam portions mechanically connected respectively with the displacement varying means of the pump and motor, and is controlled by a piston and cylinder device in turn controlled by a manually operable valve means.

Another object is to provide a new and improved cooling circuitry associated with a closed hydraulic circuit connecting a pump and motor in a hydraulic transmission, for supplying cooling fluid in excess of makeup requirements thereby to displace heated fluid from the circuit.

A further object is to provide a new and improved differential hydraulic transmission including a swashplate pump, a coaxial swashplate motor, a coaxial planetary gear set, and means for varying the displacement of the pump and the motor to vary the speed of the transmission, output shaft over a wide range.

Other objects and advantages will become readily apparent from the following detailed description taken in connection with the accompanying drawings in which:

FIG. 3 is a transverse sectional view, taken at about the line 3—3 of FIG. 2, through a valve plate positioned between the pump and motor of the transmission;

FIG. 4 is a sectional view taken at about the line 4—4 of FIG. 2, illustrating valve mechanisms attached to the valve plate shown in FIG. 3;

FIG. 5 is an enlarged fragmentary elevational view, similar to the showing in FIG. 2, illustrating the control for pump and motor swashplates illustrated in the preceding figures;

FIG. 6 is a sectional view taken at about the line 6—6 of FIG. 5, but partly in elevation;

FIG. 7 is a fragmentary showing of a modified circuit;

FIG. 8 is a diagrammatic showing illustrating a modified form of the transmission;

FIG. 9 illustrates another modification of the transmission;

Figure 1:
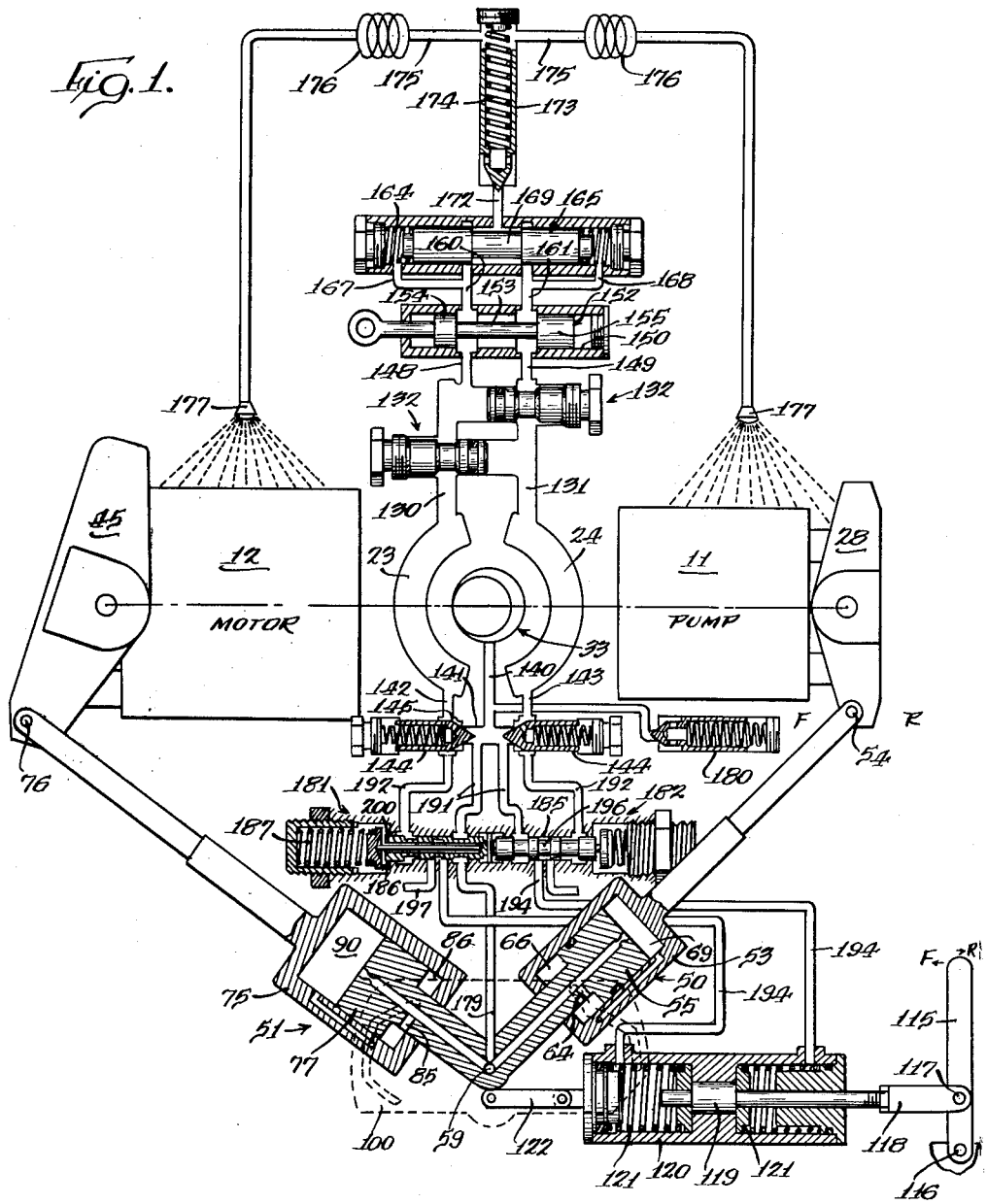
FIG. 1 is a diagrammatic showing of mechanical hydraulic features of a transmission embodying the principles of the present invention.

While illustrative embodiments of the invention are shown in the drawings and will be described in detail herein, the invention is susceptible of embodiment in many different forms, and it should be understood that the present disclosure is to be considered as an exemplification of the principles of the invention and is not intended to limit the invention to the embodiments illustrated. The scope of the invention will be pointed out in the appended claims.

Referring now to the embodiment of FIGS. 1-6, this will first be described with reference to the structural views of FIGS. 2-6 and then in connection with the circuit diagram of FIG. 1. As seen in FIG. 2, the transmission includes a housing 10 in which there is positioned a pump 11 and a motor 12. The pump 11 includes a rotatable cylinder block 15 splined on a drive shaft 16 for rotation therewith and formed with a plurality of axial cylinder bores as at 17 respectively housing reciprocable pistons 18. The cylinder block 15 is biased by a spring 19 against a port plate 20 pinned to a center valve plate 21 stationarily mounted in the housing. The port plate 20 and the valve plate 21 are formed with complementary arcuate shaped inlet and outlet ports 23 and 24, (FIG. 3) for successive communication with ports 25 in the cylinders 17 as the cylinder block rotates to admit and exhaust fluid to and from the cylinders 17.

Outer ends of the pistons 18 cooperate with a swashplate 28 pivotable in opposite directions from a minimum displacement neutral center position (FIG. 1) to maximum displacement positions at opposite sides of the center position in order to vary the displacement of the pump and to provide reversible flow through the pump. That is, either of the arcuate ports 23 and 24 may function as inlet or outlet, depending upon the position of swashplate 28. Pump drive shaft 16 is connected for rotation with an input shaft 30 and carries a gear 31 meshing with a gear 32 to drive a makeup pump 33.

The motor 12 is similar to the pump 11, but somewhat larger, and includes a cylinder block 35 splined on an output shaft 36 for rotation therewith and formed with cylinders 37 housing reciprocable pistons 38. Cylinder block 35 is urged by a spring 40 against a port plate 41 abutting the center valve plate 21. Port plate 41 is formed with arcuate ports cooperating with the ports 23 and 24, so that the pump and motor are connected in a closed, closely coupled hydraulic circuit. Cylinder ports 43 cooperate with the ports in the valve plate 41. Outer ends of the pistons 38 cooperate with a swashplate 45 variable between a minimum displacement position and a maximum displacement position illustrated in FIGS. 1 and 2.

Input shaft 30 is adapted to be driven by a prime mover such as an internal combustion engine conventionally associated with tractors and the like. The motor shaft 36 is connected to an output shaft 47 adapted to be connected with the propelling wheels of the tractor.

The swashplates 28 and 45 are controlled respectively by similar piston and cylinder devices 50 and 51, illustrated in detail in FIGS. 5 and 6. The device 50 includes a cylinder 53 pivotally connected as at 54 to the swashplate 28 to pivot the latter as the cylinder slides on a piston 55 having a piston rod 56 pivotal on a fixed pivot shaft 57.

In operation, control fluid under pressure is supplied constantly to the piston and cylinder device 50 by makeup pump 33 through passages including an axial bore 59 in the shaft 57 communicating with radial ports 60 leading to an annular groove 61 in turn communicating with a passage 62 in the piston 56. The passage 62 leads to a chamber 63 having a port 64 communicating with a chamber 66 at one side of the piston 55 in the cylinder 53. The chamber 63 also communicates through a restrictive orifice 68 with a chamber 69 at the opposite side of the piston 55 in the cylinder 53. Chamber 69 communicates with a passage 71 terminating in a restricted valving port 72.

It will be understood that if the port 72 is closed, the pressure in chamber 69 eventually will equal that in the chamber 66, and due to the larger piston area exposed in the chamber 69, the cylinder 53 will be moved toward the right in FIG. 6, pivoting the swashplate 28 in a counter-clockwise direction, as viewed in FIG. 2. On the other hand, if the port 72 is opened, the reduced pressure in the chamber 69 as compared to that in the chamber 66 permits the latter pressure to move the cylinder 53 to the left as viewed in FIG. 6, pivoting the swashplate 28 in a clockwise direction. In this manner, the swashplate 28 may be pivoted in either direction from the neutral center position illustrated in FIG. 1. In operation, a static position is desirably obtained by partially opening and partially closing the port 72 so that the product of the reduced pressure in chamber 69 acting against the relatively larger piston area is equal to the relatively greater pressure in chamber 66 acting against the relatively smaller piston area.

The means controlling the opening and closing of the valve port 72 will be described presently.

The piston and cylinder device 51 controlling the motor swashplate 45 is similar to the device 50, and includes a cylinder 75 pivotally connected to the swashplate 45 as at 76 and slidable on a piston 77 including a piston rod 78 pivotally mounted on the shaft 57. Fluid is supplied to the piston and cylinder device 51 through the passage 59, radial port 80, annular port 81, passage 82 and a chamber 83. The chamber 83 communicates through a passage 85 with a chamber 86 at one side of the piston 77 and communicates through a restricted passage 88 with a chamber 90 at the opposite side of the piston 77. Chamber 90 communicates with a passage 91 terminating in a valving port 92 controlled in a manner to effect movement of the motor swashplate between a minimum displacement position and the maximum displacement position illustrated in FIGS. 1 and 2.

Flow of fluid from the valving ports 72 and 92 to the interior of the housing 10 is controlled by a cam or valve plate pivotally mounted for movement about the axis of the shaft 57. As best seen in FIG. 5, the plate 100 is formed with a slot 102 having a radially inner peripheral edge controlling the port 72 for varying the pump swashplate angle and a slot 103 having a radially inner peripheral edge for controlling the port 92 to vary the motor swashplate angle.

The slot 102 is formed with an end portion 104 concentric with the pivot axis, a central portion 105 which is eccentric to the pivot axis and an end portion 106 concentric with the pivot axis. In operation, when the transmission, is at rest, the plate 100 is normally positioned as illustrated in FIG. 5, with the port 72 at the midportion of the inner peripheral edge of the slot portion 105. This results in positioning the pump swashplate 28 at the neutral minimum displacement center position. It will be understood that if the plate 100 is pivoted in a clockwise direction about the axis of the shaft 57, the shape of the slot portion 105 is such that the port 72 is uncovered, resulting in a greater pressure in the chamber 66 than in the chamber 69 and a movement of the cylinder 53 to the left as viewed in FIG. 6 and a consequent pivoting of the swashplate 28 in a clockwise direction toward the position illustrated in FIG. 2. This results in operation of the transmission in a direction which may be described as forward. On the other hand, if the plate 100 is pivoted in a counterclockwise direction, the formation of the slot portion 105 is such that the port 72 will be closed, resulting in an increase in pressure in chamber 69 such that the cylinder 53 moves toward the right as viewed in FIG. 6 with a consequent pivotal movement of the swashplate 28 in a counterclockwise direction from the neutral position. This results in operation of the transmission in a reverse direction.

Obviously, with the port 72 positioned at either end of the slot portion 105, movement of the plate 100 back toward the position shown in FIG. 5 will result in returning the swashplate 28 to the neutral position.

At opposite ends of the slot portion 105, the slot portions 104 and 106 are substantially concentric about the axis of the shaft 57 so that movement of these slot portions relative to the port 72 does not effect an adjustment of the swashplate 28. As will appear presently, slot portions 104 and 106 enable retention of the swashplate 28 in maximum displacement positions while continued movement of the plate 100 is utilized to vary the angle of the motor swashplate 45.

The slot 103 controlling the port 92 is formed with a central slot portion 108 substantially concentric with the axis of the shaft 57 and opposite end portions 109 and 110 which are not concentric with the axis of the shaft 57, but are relied upon for varying the angle of the swashplate 45. Angularly about the axis 57, the length of the slot portion 108 corresponds to the length of the slot portion 105 while the length of the slot portions 109 and 110 correspond respectively with the length of slot portions 104 and 106. Thus, in operation, when the transmission is at rest, the port 92 is positioned at the midpoint in the inner periphery of the slot portion 108. Upon movement of the plate 100 in either direction from the position shown in FIG. 5, the swashplate 45 remains in the maximum displacement position illustrated in FIGS.

1 and 2 during the time the port 92 encounters the slot portion 108. It will be understood that this provides for retention of the swashplate 45 in a maximum displacement position while the pump swashplate 28 is moved from a minimum displacement position to a maximum displacement position.

When the port 92 encounters the inner periphery of either slot portion 109 or 110, the port 92 will be uncovered, resulting in a pressure drop in the chamber 90 sufficient to enable movement of the cylinder 75 toward the right as viewed in FIG. 6 and consequent movement of the swashplate 45 in a counterclockwise direction toward a minimum displacement position. At this time, the port 72 encounters the concentric slot portion 104 or 106 so that the pump swashplate remains in a maximum displacement position while the motor swashplate is moved toward a minimum displacement position.

The operation described above results in bringing the transmission up to speed by first varying the pump swashplate from a minimum displacement position to a maximum displacement position and then varying the motor swashplate from a maximum displacement position to a minimum displacement position. Conversely, when the speed of the transmission is reduced, the motor swashplate is first moved from a minimum displacement position toward a maximum displacement position, and the pump swashplate is then moved from a maximum displacement position toward a minimum displacement position.

Pivotal movement of the plate 100 is controlled by a manually operable control including a handle 115 (FIGS. 1 and 2) pivotally mounted on the housing 10 as at 116 and pivotally connected at 117 to a link 118 which is a piston rod connected to a piston 119 in a movable cylinder 120 normally maintained in a center position on the piston 119 by centering springs 121. The cylinder 120 is in turn connected by a link 122 to pivot the plate 100.

In operation, the springs 121 are sufficiently strong that manual movement of the handle 115 and consequent movement of the piston 119 cause movement of the cylinder 120 and the plate 100 all together without relative movement between the piston 119 and the cylinder 120. Thus, the transmission may be brought to speed or reduced in speed by movement of the handle 115. The piston and cylinder device 119, 120 however, provides an override control responsive to the pressure in the closed circuit between the pump and motor for overriding the manual operation in cases where the pressure rise in the circuit is sufficient, as explained in more detail hereinafter.

Guide pins 123 and 124 (FIG. 6) secured respectively to the cylinders 53 and 75 fit slots 125 and 126 in plate 100 corresponding in shape respectively with the valving slots 102 and 103.

Figure 2:
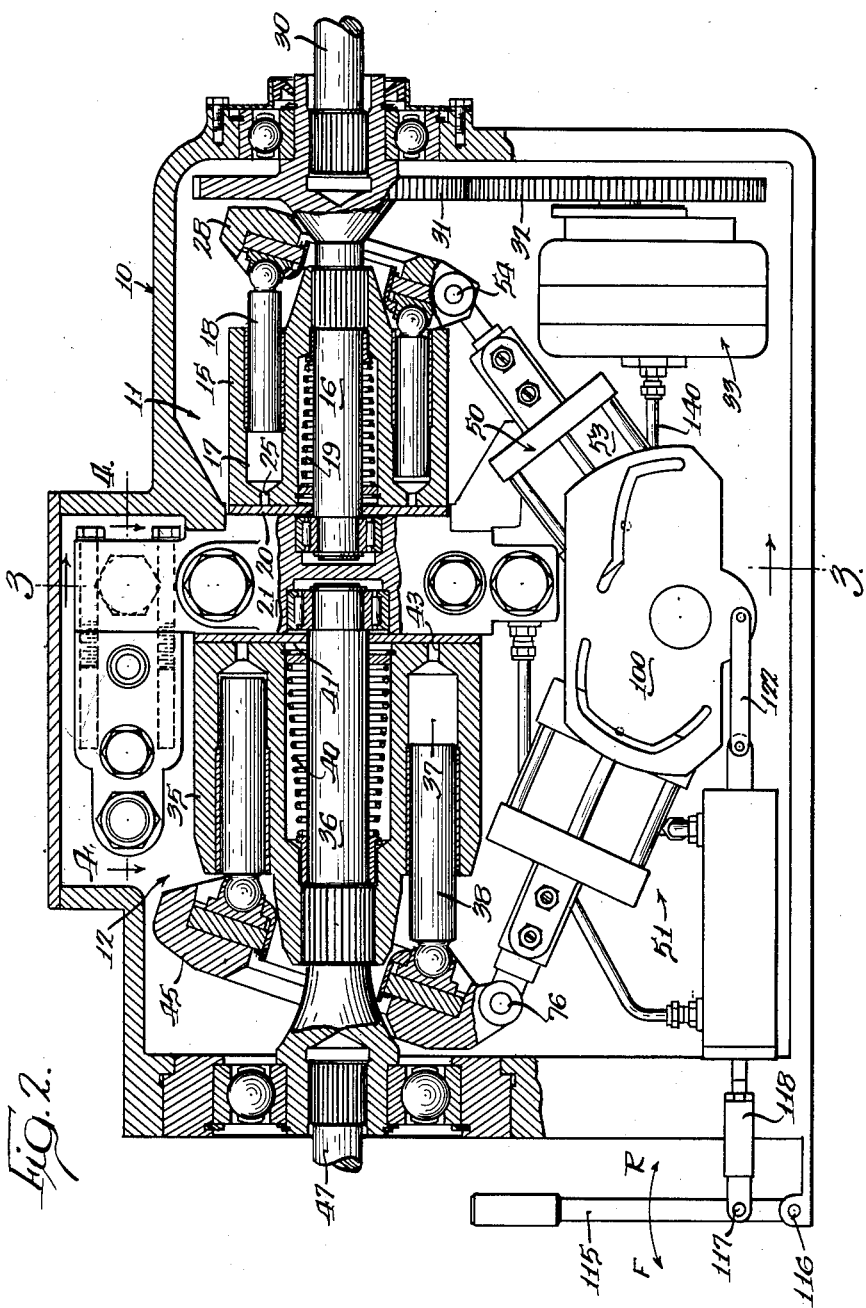
FIG. 2 is a longitudinal sectional view, partly in elevation, through the transmission illustrated diagrammatically in FIG. 1.

To elaborate on the circuit, as illustrated in FIGS. 1, 3 and 4, arcuate ports 23 and 24 communicate respectively with passages 130 and 131, each communicating with a high pressure relief valve as at 132. As seen best in FIG. 3, each relief valve 132 includes a sleeve member 133 housing a piston member 134 urged by spring 135 toward a valve closing position, wherein the piston closes ports 136. Piston member 134 is movable against the bias of spring 135 for relieving excessively high pressure in either of the ports 23 and 24 to the other of the ports.

As will appear, the circuit is a substantially constant pressure system, wherein pressure is regulated by control of the pump and motor swashplates 28 and 45 exercised by the override piston and cylinder device 119, 120. Thus, the high pressure relief valves 132 function only to relieve sudden high pressure surges before the control 119, 120 is effective to reduce pressure.

The makeup pump 33 draws fluid from the interior of casing 10 and supplies such fluid to the low pressure side of the circuit in excess of makeup requirements for purposes of cooling. Due to the close coupled nature of the pump and motor, the length of the conduits connecting these two in closed circuit being only the thickness of the valve plate 21 and port plates 20 and 41, the fluid does not pass through long pipes or conduits which effectively provide cooling loops. The fluid thus may become excessively heated. The supply of fluid by the makeup pump in quantities in excess of that required for makeup purposes is utilized to force heated fluid from the low pressure side of the circuit.

The makeup pump 33 delivers fluid through a conduit 140 (FIGS. 1 and 2) to branch passages provided by a bore 141 (FIGS. 1 and 3) in the valve plate 21. The bore 141 communicates with branch passages 142 and 143 leading respectively to the arcuate ports 23 and 24. Communication between the conduit 140 and the branch passages 142 and 143 is normally prevented by spring pressed makeup check valves 144 urged against valve seats at opposite ends of the bore 141. Each of the valve members 144 is provided with one or more ports as at 145 communicating respectively with the passages 142 and 143 so that pressure in the high pressure port of the ports 23 and 24 is effective to maintain the associated check valve closed, while fluid from the makeup pump forces the other valve to an open position admitting makeup and cooling fluid to the low pressure port of the ports 23 and 24.

Makeup fluid in excess of that required for makeup purposes forces heated fluid from the low pressure port 23 or 24 through the associated passage 130 or 131 to one of passages 148 and 149 (FIGS. 1 and 4) communicating respectively with the passages 130 and 131. Passages 148 and 149 communicate with a bore 150 having a "neutral" valve member 152 slidable therein. Valve member 152 is provided with a reduced central portion 153 between enlarged piston portions 154 and 155 at opposite ends of the valve member.

In operation, when the transmission is at rest, the valve member 152 is positioned as illustrated in FIG. 1 to connect the passages 148 and 149, thereby communicating the high pressure and low pressure sides of the transmission, to assure that the transmission will remain inoperative. When the transmission is to be set in operation, valve member 152 is moved axially, toward the left as viewed in FIG. 1, for example, to position the piston portion 155 between the ports communicating with the passages 148 and 149 to block communication between such passages. The low pressure and high pressure sides of the circuit are thereby isolated to permit operation of the transmission. Movement of the valve member 152 to the last mentioned position may be facilitated by means of a spring shown at 158 in FIG. 4. Movement of the valve member 152 to the position illustrated in FIG. 1 may be facilitated by interconnection with the manually accessible handle 115 for controlling pump and motor displacement in a manner not illustrated herein.

Valve bore 150 for the neutral valve member 152 communicates with passages 160 and 161 respectively aligned with the passages 148 and 149 and leading to a valve bore 164 housing a valve member 165 which functions as a shuttle valve. Valve member 165 is normally spring centered as shown in FIGS. 1 and 4, but opposite ends of the valve member are exposed to fluid pressure in the passages 160 and 161, by means of branch passages 167 and 168, so that fluid in the high pressure conduit is effective to shift the valve member 165 to a position in which a reduced central portion 169 thereon connects either the passage 160 or the passage 161, whichever is the low pressure passage, to a relief passage 172 leading to a relief valve 173 normally urged to a closed position by the spring 174 but movable to an open position by pressure of fluid in the low pressure conduit to exhaust heated fluid from the closed circuit.

Heated fluid flowing through the relief valve passes to branch conduits 175, through cooling loops as at 176 and then to spray heads as at 177 for discharging the then cooled fluid over the pump and motor mechanisms respectively. The fluid is thereby returned to the interior of the casing 10 for intake by the makeup pump.

Shuttle valve 165 is preferably spring centered in order to assure return of the valve member to the neutral center position blocking communication of the passages 160 and 161 with the passage 172 during the interval when the transmission may be in the process of being shifted from forward to reverse, or vice versa, from reverse to forward. In the interim, since both of the passages 160 and 161 are substantially blocked, as illustrated in FIG. 4, it is desirable to provide a relief valve associated with the makeup passage 140, as at 180, to thereby relieve the pressure of makeup fluid until such time as the shuttle valve is shifted by the buildup of pressure in the high pressure side of the circuit.

In order to provide for operation of the piston and cylinder devices 50 and 51, respectively controlling the angles of the pump swashplate 28 and the motor swashplate 45, control fluid under pressure is supplied by the makeup pump 33 to the axial passage 59 in the pivot shaft 57 (FIGS. 1 and 6), by any suitable conduit means which may be as shown diagrammatically in FIG. 1, at 179. As shown in FIG. 1, the passage 179 leads links from a port in one of a pair of separate torque multiplication and overpressure controls 181 and 182 to be described presently, but it will be understood that the conduit may lead directly from the makeup pump to the passage 59 if desired. In FIG. 3, the passage 183 may be utilized, if desired, to serve the purpose of the passage shown at 179 in FIG. 1.

The torque and overpressure controls 181 and 182 are pressure responsive valves controlled by pressure increase in the ports 23 and 24 and in turn controlling the flow of pressure fluid from the makeup circuit to the override control 119, 120 which may function to take over operation of the transmission from the manual control 115.

As shown in FIGS. 1 and 3, each of the control valves 181 and 182 includes a bore as at 185 receiving a valve member 186 urged by a spring 187 toward a normal position in which the valve member abuts a stop pin 189. Passages 191 communicate with the makeup passages 140 and 141 and respectively with the valve bores 185. Passages 192 communicate at one end with the passages 142 and 143 and at the opposite ends respectively with the valve bores 185 at positions spaced axially from the passages 191. Passages 194 lead respectively from the bores 185 to opposite ends of the override cylinder 120.

In operation, the valve members 186 are normally positioned as illustrated in FIGS. 1 and 3, so that the override cylinder passages 194 communicate respectively with annular grooves 196 in the valve members 185, connecting the passages 194 to drain passages as at 197 (not visible in FIG. 3) so that opposite ends of the cylinder 120 are exposed to drain pressure and the cylinder remains centered on the piston 119 by virtue of the spring means 121.

It will be recalled that high pressure in one of the ports 23 and 24 maintains the associated check valve 144 in the closed position illustrated so that such high pressure fluid is conducted through the associated passage 192 to act against an enlarged piston portion 200 on the associated valve member 186 while the corresponding piston portion of the other valve member is exposed to relatively lower makeup fluid pressure by virtue of the open check valve 144. Thus, if the pressure rises sufficiently in the high pressure conduit 192, the valve member 186 may be moved against the pressure of spring 187 to a position blocking communication between the cylinder passage 194 and the drain passage 197 and communicating the control fluid passage 191 with the cylinder passage 194 to admit pressure fluid to one end of the override cylinder 120, causing movement of the cylinder relative to the piston.

The controls 181, 182 and the controls 119, 120 are calculated to function on excessive pressure increase in the high pressure conduit under two conditions, namely, in the case where the transmission in operating at high speed and an increased load is encountered, causing a pressure increase, and in the case where the manually operable control 115 is moved rather rapidly from a neutral position toward a high speed position, increasing pump displacement rather rapidly at a time when the motor resists rapid speed increase due to the inertia of the vehicle associated with the transmission.

The override controls are also calculated to function on reducing the speed of the transmission, where the manual control 115 is moved rather rapidly from a high speed position toward a neutral position. This results in slowing the motor at a time when the vehicle has a certain momentum which tends to drive the motor as a pump. The motor, thus functioning as a pump, tends to drive the pump as a motor. There is a consequent pressure increase in the low pressure conduit which may become sufficient to bring the override controls into operation.

Considering first and the overload situation, assume that the manual control 115 (FIG. 1) is pivoted in a counter-clockwise direction, pivoting the plate 100 in a clockwise direction and the pump swashplate 28 in a clockwise direction, followed by pivotal movement of the motor swashplate 45 in a counter-clockwise direction. This places the transmission in operation at full speed. If now, the tractor encounters an increased load condition, pressure in the high pressure conduit increases due to the increased resistance of the motor to turn. If the pressure in the port 24, the high pressure port under these conditions, rises above a predetermined value, the valve member 186 associated with the port 24 is shifted toward the right as viewed in FIG. 1 by virtue of the pressure acting through the passage 192 against the left side of the piston portion 200 of the right hand valve 182. This valve movement places the passage 191 in communication with the passage 194 to admit control fluid to the right end of the override cylinder 120, shifting the cylinder toward the right as viewed in FIG. 1, even though the handle 115 remains in the counter-clockwise position. The movement of the cylinder 120 toward the right results in pivoting the valving plate 100 in a counter-clockwise direction. The first effect of the counter-clockwise movement of the plate 100 is to increase the angle of the motor swashplate 45 toward a maximum displacement position to increase the torque, while reducing the speed, in an effort to overcome the increased load. If the increased load is not overcome by the increased torque, continued movement of the valving plate 100 in a counter-clockwise direction results in returning the pump swashplate 28 toward a minimum displacement position so that the transmission becomes stalled, but without continuing operation of the pump which would result in pumping fluid over the high pressure relief valve 132, and a consequent loss of power.

It will be understood that the override controls are equally effective when the transmission is being operated reversely, without a detailed description.

Considering now the situation where the transmission is being brought up to speed, let it be assumed that handle 115 is moved rapidly in a counter-clockwise direction as shown in FIG. 1, pivoting the valving plate 100 in a clockwise direction. As previously described, the first effect of the clockwise movement of plate 100 is to increase the angle of the pump swashplate 28 toward a maximum displacement position. If this occurs rather rapidly, while the tractor is at rest, the inertia of the tractor places a considerable load on the motor 12, resulting in a pressure increase in the high pressure port 24. If the pressure rises above a predetermined value, again it becomes sufficient to shift the valve member 186 toward the right, admititng fluid under pressure to the right end of the override cylinder 120. The cylinder moves toward the right, lagging the manually movable piston 119 which is being moved toward the left. As the transmission gains speed, the pressure in the port 24 reduces, allowing the valve member 186 to move toward a closed position, connecting opposite ends of the cylinder 120 to drain so that it may follow the piston 119. In this manner, the cylinder 120 eventually follows the piston 119, but at a controlled rate determined by the pressure in the high pressure port 24, thereby bringing the transmission up to speed at a controlled rate, by first increasing the displacement of the pump and thereafter decreasing the displacement of the motor. Again, this occurs without a substantial loss of fluid pumped over the high pressure relief valve 132, which functions primarily to relieve sudden pressure surges prior to operation of the override controls.

It will be understood that the override controls will be equally as effective in bringing the transmission up to speed in a reverse direction.

Considering the situation now where the speed of the transmission is being reduced, for example, by movement of the handle 115 from a counter-clockwise position toward the neutral center position illustrated in FIG. 1. If the handle movement occurs rapidly, displacement of the motor is immediately increased, thereby reducing the motor speed. The momentum of the vehicle, however, tends to drive the motor as a pump, and in turn the pump 11 tends to be driven as a motor. Under these conditions, the low pressure port 23 becomes pressurized, and if the pressure exceeds a predetermined value, the left hand valve member 186 is shifted toward the left as viewed in FIG. 1 to admit pressure fluid to the left end of the override cylinder 120. This results in movement of the cylinder to the left relative to the piston 119, so that the former lags the latter in returning toward the neutral position. When the pressure in port 23 is thereby reduced, the cylinder 120 follows the piston 119. Thus, the transmission is brought to rest or to a reduced speed at a controlled rate, without substantial loss of fluid over the high pressure relief valve 132.

FIG. 7 illustrates a modified form of the circuit, which provides the advantage of eliminating a shuttle valve as at 165 in FIG. 1, and combining with each makeup inlet check valve a valving portion for exhausting heated fluid. In FIG. 7, the parts corresponding to similar parts in FIG. 1 have been designated by similar reference numbers with a prime suffix. Also, in order to simplify the disclosure, only that portion of the circuit involving changes has been illustrated in FIG. 7, but it should be understood that the passages 191' and 192' in FIG. 7 are connected with and control the same parts as are connected with and controlled by the passages 191 and 192 in FIG. 1.

In FIG. 7, the makeup passage 140', leading from the makeup pump 33', communicates with a pair of makeup valves generally designated 205, each including a valve member 206 normally urged to a closed position as illustrated by a spring 207. In operation, fluid in the high pressure port of the ports 23' and 24', flowing through either the passage 142' or 143', and through a radial port 208 in valve member 206, maintains the valve member in closed position, while makeup fluid from the passage 140' forces the other valve member 206 to a position communicating a radial port 209 with the low pressure passage of the passages 142' and 143' in order to admit makeup fluid to the low pressure side of the circuit.

As in the previously described modification, makeup fluid is admitted in excess of makeup requirements for purposes of cooling the system. The excess makeup fluid thus admitted, forces heated fluid from the low pressure side of the circuit through one of a pair of conduits 211 connected respectively with the passages 130' and 131' and leading respectively to the valves 205. Movement of the makeup valve member 206 to admit makeup fluid to the low pressure side of the circuit also places a reduced portion 212 of the valve member in a position communicating the passage 211 and an associated passage 213 leading to the relief valve 173'. As in the previously described modification, heated fluid flowing through relief valve 173' passes to branch passage 175' leading to cooling loops and spray heads in the transmission housing.

It will be understood that this modification has the advantage of eliminating the necessity of a shuttle valve and incorporating in each makeup inlet check valve a valve means for exhausting heated fluid from the circuit thereby to produce an advantageously compact arrangement.

FIG. 8 illustrates a transmission utilizing a modified form of override control. This transmission includes a swashplate pump 225 and a swashplate motor 226 connected in a closed hydraulic circuit including conduits 227 and 228. Makeup fluid is supplied by a makeup pump 229 drawing fluid as through a conduit 230 from a reservoir represented at 231. The makeup pump delivers fluid through a passage 233 communicating with check valves 234 leading respectively to the conduits 227 and 228 so that makeup fluid flows to the low pressure conduit. Makeup fluid in excess of that required for makeup and control purposes later referred to, is discharged over a relief valve 236 back to the reservoir 231.

The speed of the transmission is controlled by varying the angle of the pump swashplate 238 and the angle of the motor swashplate 239 between minimum displacement and maximum displacement positions. The pump swashplate 238 is adjustable in opposite directions toward maximum displacement positions from a neutral minimum displacement center position illustrated in FIG. 8, so that fluid may be pumped through either of the conduits 227 or 228 to the motor 226, thereby to operate the latter either forwardly or reversely. The motor swashplate is variable from a maximum displacement position illustrated in FIG. 8 to a minimum displacement position not illustrated.

In order to vary the angle of the pump swashplate 238, it is connected by means of a link 242 to a slide rod 243 terminating in a cam follower roller 244. The angle of the motor swashplate 239 may be varied by means including a link 246 connected to the slide rod 247 terminating in a cam follower roller 248.

Both the pump swashplate and the motor swashplate are controlled by a single cam member 250 reciprocably mounted and formed with a cam slot 251 engaged with the follower roller 244 and a cam slot 252 engaged with the cam follower roller 248.

Cam slot 251 includes a central portion 253 inclined to the direction of movement of the member 250, and opposite end portions 254 and 255 parallel to the direction of movement of the member 250. When the transmission is at rest and the pump swashplate 238 in the neutral central position illustrated, the follower 244 is disposed approximately midway in the length of the slot portion 253, so that on movement of the cam 250 in opposite directions from the centrally disposed position illustrated, the pump swashplate 238 will be moved in opposite directions toward maximum displacement positions. At the ends of the slot portion 253, the slot portions 254 and 255 enable continued movement of the cam 250 without altering the maximum displacement position of the swashplate 238.

As will appear, the construction of the slot 251 provides for first varying the angle of the pump swashplate to a maximum displacement position while the motor swashplate is maintained in maximum displacement position, and then maintaining the pump swashplate in the maximum displacement position while the motor swashplate is moved to a minimum displacement position, in bringing the transmission up to speed. In reducing the speed of the transmission, the motor swashplate is first moved to a maximum displacement position and then the pump swashplate is moved to a minimum displacement position.

The above described operation is facilitated by the formation of the slot 252 to include a central portion 258 parallel to the direction of movement of the member 250 and opposite end portions 259 inclined to the direction of movement of the member 250 for adjusting the swashplate 239.

In operation, the cam 250 is adjusted by a manual control including a pivoted handle 260 connected with a valve stem 261 slidable in a piston 262 normally centered by springs 263 in a cylinder 265. Opposite end chambers 266 and 267 are constantly supplied with control fluid under pressure from the makeup pump 229 through a conduit 268 and branch conduits 269 and 270 each provided with a restrictive orifice as at 271.

Control fluid admitted to the chambers 266 and 267 as described above is normally metered through passages 272 and 273 in the piston 262 and across valving portions on the stem 261 at opposite ends of a reduced intermediate portion 275. Fluid from the reduced portion 275 flows through drain ports 266 and a drain passage 267' formed by a reduced intermediate portion of the piston 262.

When it is desired to bring the transmission up to speed, the handle 260 may be moved upwardly, moving the valve stem 261 upwardly to a position blocking communication between the passage 273 and the drain port 266', and communicating the passage 272 and drain port 266. The lower chamber 267 is thus pressurized while the upper chamber 266 is connected to drain thereby to effect an upward movement of the piston 262, following the stem 261. As previously noted, this will result in first increasing the displacement of the pump and then reducing the displacement of the motor to bring the transmission up to full speed.

If the handle 260 is moved downwardly as viewed in FIG. 8, the transmission will be brought up to speed in a similar fashion, but with the pump swashplate moved in the opposite direction from neutral to operate the transmission in a reverse direction.

If an increased load is encountered while the transmission is operating in full speed or at a high speed, sufficient to cause a predetermined increase in pressure in the high pressure conduit (the conduit 227 if the transmission is operating forwardly) this pressure acts through a passage 280 to shift a torque multiplication and overpressure valve member 281 upwardly against the urge of a centering spring 282. Such movement of the valve member 281 connects a drain passage 283 to a passage 284 leading from the lower cylinder chamber 267, thereby connecting the chamber 267 to drain. The relatively greater pressure in the chamber 267 causes movement of the piston 262 downwardly, returning the cam 250 toward a neutral position to first increase the displacement of the motor and increase the torque in an effort to overcome the increased load. If the load is not overcome, continued movement of the piston 262 and the cam 250 then reduces the displacement of the pump to zero, stalling the transmission but without pumping fluid over a high pressure relief valve.

Although the downward movement of the piston 262 as described above, while the handle 260 remains in the upper position, connects passage 272 to drain port 266', the restricted nature of the drain port allows the fluid to flow from chamber 266 less rapidly than it flows from the chamber 267 through the relatively free passages of the torque and overpressure valve 281. Thus, the piston 262 may be reutrned to the neutral position.

It will be understood that the override controls described above will be equally effective in the event of an increased load on the transmission while the latter is operating reversely.

If the handle 260 is moved rapidly toward the full speed position in a forward direction, causing an increase in pump displacement, at a time when a substantial resistance opposes the motor by virtue of the inertia of the tractor, a resultant increase in pressure in conduit 227 will cause the torque multiplication and overpressure control valve 281 to operate in the manner described above to tend to return the piston 262 to the neutral position until pressure in the conduit 227 reduces. After a reduction in pressure, the piston 262 tends to follow the stem 261, though the former may lag the latter. In this manner the transmission is brought up to speed at a controlled rate avoiding the undesirable condition where fluid under excessive pressure is pumped over a relief valve with a resultant loss of power.

It will be understood that the override control is equally effective in bringing the transmission up to speed in a reverse direction.

In the case where the handle 260 is moved quickly from a full speed forward position toward the neutral center position illustrated, and the momentum of the vehicle tends to drive the motor as a pump, so that fluid is delivered by the latter tending to motor the pump, a pressure increase will occur in the would-be low pressure conduit 228. If the pressure in the conduit 228 rises above a predetermined value corresponding to the setting of centering spring 282 in the torque multiplication and overpressure control valve 281, this pressure moves the valve 281 downwardly to a position connecting drain passage 283 to a passage 286 communicating with the upper chamber 266. Pressure in the lower chamber 267 thus becomes relatively greater, causing movement of the piston 262 upwardly relative to the stem 261 so that the piston lags the stem and is returned to neutral at a controlled rate.

High pressure relief valves as at 288 communicate respectively with the passages 227 and 228 through conduits 289 so that high pressure surges occurring before the override controls take over are relieved to the low pressure side of the circuit.

FIG. 9 illustrates another circuit utilizing a modified override control including a rotary cam for varying the pump and motor swashplates.

A variable displacement swashplate pump is represented by an adjustable swashplate 300 pivotable as at 301, and a variable displacement motor is represented by swashplate 302 pivotable as at 303. The pump and motor are connected in a closed hydraulic circuit, opposite sides of which are represented by arcuate ports as at 304 and 305. Makeup fluid is supplied to the low pressure side of the circuit from a tank or reservoir as illustrated at 307, by means of a makeup pump 308 which delivers fluid through a conduit 309 to makeup check valves 310. Fluid in th high pressure port maintains the associated valve 310 closed, while makeup fluid from the pump 308 opens the valve 310 associated with the low pressure side of the circuit to admit makeup fluid.

In order to insure that makeup fluid is first supplied to the closed hydraulic circuit before being supplied to the control circuits to be described, a makeup sequence valve is provided as at 312, and normally maintained in a closed position by a spring 313. When makeup fluid is adequately provided to the closed circuit, pressure acting through a passage 314 moves valve member 315 to a position communicating a passage 316 and a passage 317 leading to the control circuit. Fluid in excess of that required for makeup and control purposes is discharged over a relief valve 318 and returned through a conduit 319 to the tank 307.

Adjustment of the pump and motor swashplates is controlled by a rotary cam member 325 having separate cam slots as at 326 and 327 respectively controlling the pump swashplate 300 and the motor swashplate 302.

The cam slot 326 has a center section 328 eccentric to the pivot axis 329 of the cam 325 for varying the angle of the pump swashplate 300 in opposite directions from the neutral position shown on rotation of the cam in opposite directions from the center position illustrated. Slot 326 includes opposite end portions 330 concentric about the pivot axis 329 to hold the swashplate 300 in maximum displacement positions during adjustment of the motor swashplate 302.

The cam slot 327 has a center section concentric about the pivot axis 329 to hold the motor swashplate 302 in a maximum displacement position illustrated during adjustment of the pump swashplate 300, and opposite end portions eccentric of the pivot axis for adjusting the motor swashplate between the maximum displacement position shown and a minimum displacement position while the pump swashplate is held stationary.

The cam slots 326 and 327 respectively receive cam follower rollers 332 and 333 connected as by links 334 and 335 to the swashplates 300 and 302.

Pivotal movement of the cam 325 is obtained by means of a reciprocable piston 337 having teeth in mesh with teeth on the cam 325. This piston 337 is normally centered by spring means as at 338 in pressure chambers at opposite ends of the piston.

In operation, control fluid under pressure is normally supplied by the makeup pump through passage 317, branch passages 340 and restrictive orifices 340' to chambers 341 and 342 housing the spring means 338. In order to bring the transmission up to speed in a forward direction, the handle 345 may be pivoted in a clockwise direction to the position illustrated in FIG. 9, uncovering a restricted drain passage 346 in a valve plunger 347. This connects the chamber 342 to drain through a stem passage 348, a passage 349 in the piston and a passage 350 communicating with the drain port 346. The relatively greater pressure now existing in the chamber 341 causes movement of the piston 337 to the right as viewed in FIG. 9, rotating the cam 325 in a counter-clockwise direction to first pivot the pump swashplate 300 to a maximum displacement position and then pivot the motor swashplate 302 to a minimum displacement position. the movement of the piston 337 in this manner causes a following movement of the casing 352 on plunger 347 to a position where the drain port 346 no longer communicates with the passage 350, whereupon the transmission reaches a state of equilibrium. Under these conditions, the arcuate port 305 is the high pressure port and 304 is the low pressure port.

In order to reduce the speed of the transmission, the handle 345 is returned in a counter-clockwise direction toward a neutral position, placing a restricted drain port 353 in communication with a passage 354, reducing the pressure in chamber 341 so that the piston 337 is moved toward the left as viewed in FIG. 9, returning the cam 325 in a clockwise direction to the position illustrated in the drawing.

It will be understood that the transmission may be brought up to speed in a reverse direction by moving the handle 345 in a counter-clockwise direction from a central neutral position.

Torque multiplication and overpressure control valves are provided as illustrated at 356 and 357. Each comprises a valve member 359 normally biased to a closed position by a spring as at 360. Each valve member includes an enlarged piston portion 361 and these are exposed to the pressure of fluid in the ports 304 and 305 respectively as by passages 362 and 363. Thus, in the event of a pressure increase in either of the passages 362 or 363 above a predetermined value determined by the setting of the springs 360, the appropriate valve member 361 is shifted against the urge of spring 360 to a position placing a stem passage 365 in communication with a passage as at 366, the two passages 366 leading respectively to the chambers 341 and 342 at opposite ends of the piston 347. The stem passages 361 communicate respectively with passages 368 leading to the drain passage 319.

Control valves 356 and 357 function in a manner similar to the control 281 described in connection with FIG. 8, to provide an override control which takes over control of the swashplates from the manual control in the case where an increased load is encountered during operation of the transmission at full high speed, in the case where the transmission is being brought up to speed, and in the case where the speed of the transmission is being reduced, and pressure in either of the arcuate ports 304 or 305 exceeds the setting of the springs 360. In FIG. 9, the override controls function under each of the three conditions described to control the pump and motor swashplates as the latter are controlled under similar conditions in the modifications of FIGS. 1 to 8. Thus, operation of the override controls in the transmission of FIG. 9 will be understood from the previous explanation of the controls illustrated in FIGS. 1 to 8.

Figure 10:
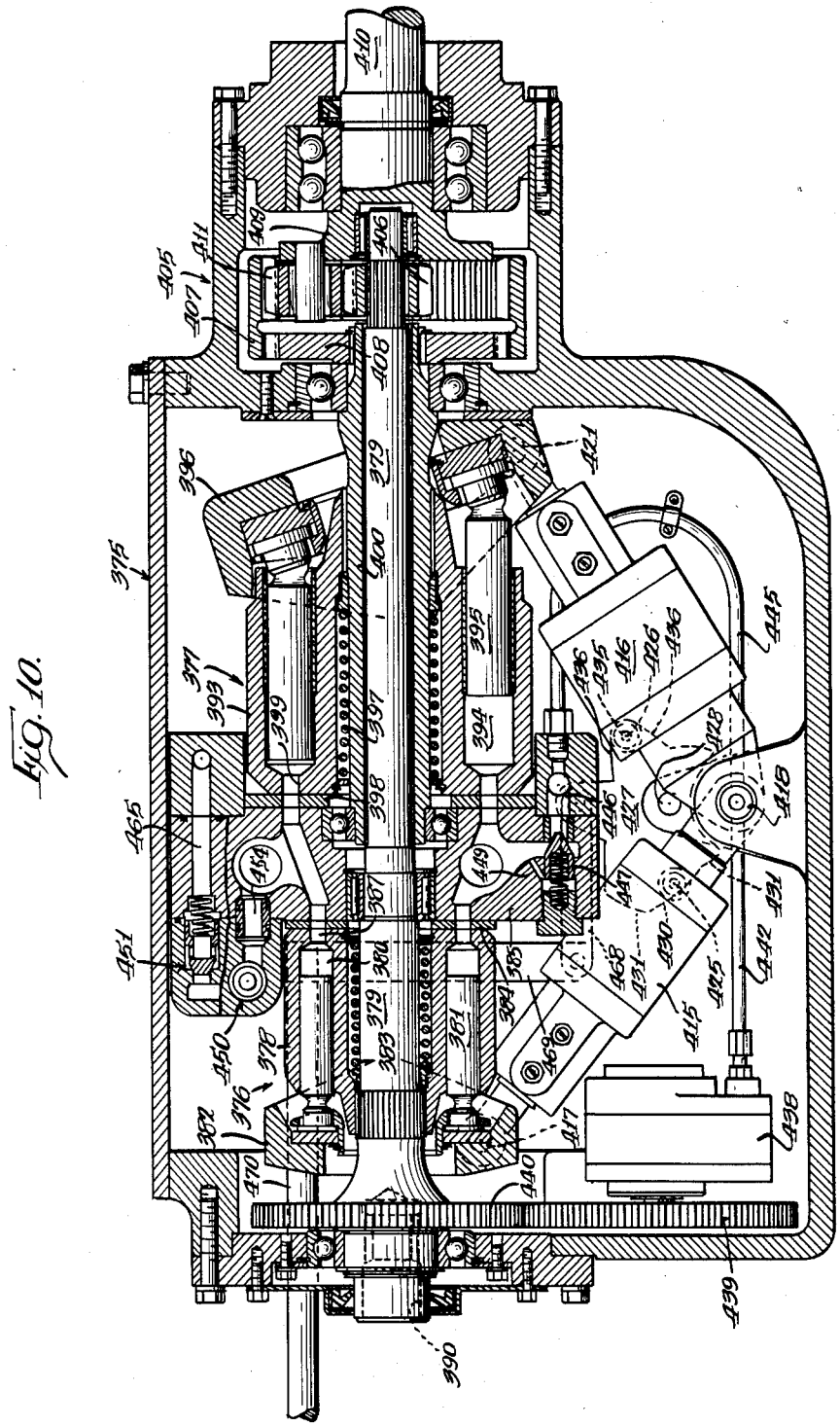
FIG. 10 is a longitudinal sectional view, partly in elevation, through a differential transmission utilizing a planetary gear set aligned with the pump and motor for obtaining a wider speed range.
Figure 11:
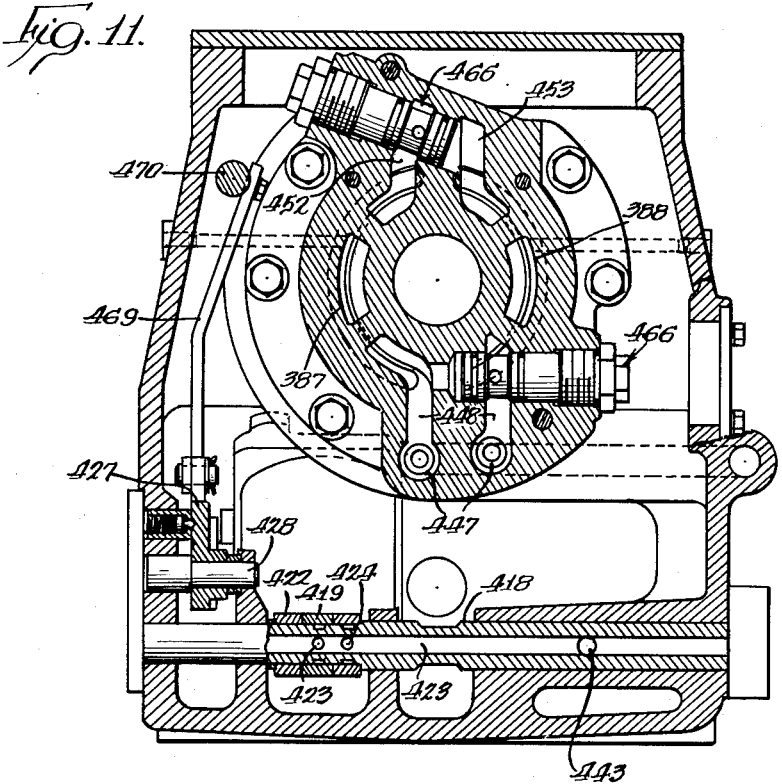
FIG. 11 is a transverse sectional view through a valve plate in the transmission illustrated in FIG. 10.
Figure 12:
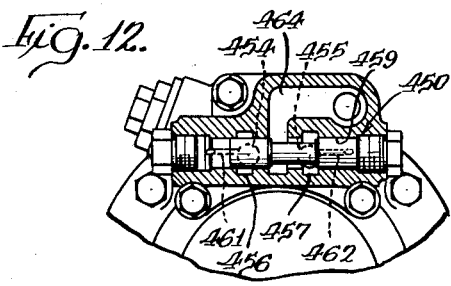
FIG. 12 is a fragmentary transverse sectional view through a valve block attached to the valve plate illustrated in FIG. 11.

The modification of FIGS. 10, 11 and 12 comprises a differential transmission utilizing a planetary gear set which provides a wider speed range. The circuit associated with this modification is similar to that utilized in connection with the embodiment described in FIGS. 1 to 6, but does not include a neutral valve as at 152 in FIG. 1, does not utilize an override control as at 119, 120 in FIG. 1, and does not include torque multiplication and overpressure valves as at 181 and 182 in FIG. 1.

Referring to FIG. 10, the transmission includes a housing 375 for a pump 376 and a motor 377. The pump includes a cylinder block 378 fixed on a pump input drive shaft 379 for rotation therewith. The block is formed with cylinders 380 having pistons 381 reciprocable therein and cooperable with a variable angle swashplate 382. The cylinder block is urged by a spring 383 against a valve plate 384 pinned to a central valve block 385, and the cylinders 380 are formed with cylinder ports 387 which communicate with complementary arcuate ports in the valve plate 384 and valve block 385 as at 387 and 388 (FIG. 11) so that as the cylinder block rotates fluid is supplied to the pump through one of the arcuate posts and discharged from the pump through the other arcuate port. Pump drive shaft 379 is provided at the end with internal splines as at 390, or equivalent means adapted for connection with a suitable input power source in the form of a prime mover such as an internal combustion engine commonly associated with vehicles such as tractors.

The motor 377 includes a cylinder block 393 formed with cylinders 394 housing reciprocable pistons 395 cooperating with a variable angle swashplate 396. Spring 397 urges the cylinder block against a valve plate 398 pinned to the central valve block 385, and the cylinders are formed with ports as at 399 cooperating with the arcuate ports 387 and 388 as the cylinder block rotates. The block 393 is attached for rotation with a tubular motor output shaft 400 concentric around an extension of the pump input shaft 379.

The pump swashplate 382 is adjustable in opposite directions angularly from the neutral center position shown so that the pump is adapted to deliver fluid under pressure to either of the ports 387 or 388 to operate the motor either forwardly or reversely. The motor swashplate 396 is adjustable from the maximum displacement position illustrated to a minimum displacement position.

The pump and motor shafts 379 and 400 are associated with a planetary gear set 405 including a sun gear 406 fixed on the pump shaft 379 for rotation therewith, and a ring gear 407 connected as by a pinion 408 to rotate with the motor shaft 400. A planetary gear carrier 409 is formed integrally with the transmission output shaft 410, and carries planetary gears as at 411 meshing with both the sun gear 406 and the ring gear 407.

In operation of this transmission, including the pump, the coaxial motor, and the planetary gear set coaxially arranged relative to both the pump and motor, if the pump swashplate 382 is retained in the neutral center position illustrated while the pump shaft 379 is rotated, the motor is not driven because the pump is not pumping, the ring gear 407 is stationary with the motor cylinder block, and the sun gear 406 on the pump drive shaft 379 drives the transmission output shaft 410 directly, through the planetary gears 411. If, now, the pump swashplate 382 is tilted in a direction to drive the motor block 393 and the ring gear 407 in a direction opposite the direction of rotation of the sun gear, the speed of the output shaft 410 may be increased. On the other hand, if the pump swashplate is tilted in the opposite direction from neutral to drive the cylinder block 393 and the ring gear in a direction corresponding to rotation of the sun gear, the speed of the transmission will be reduced and may eventually be reversed.

Adjustment of the angles of the pump and motor swashplates 382 and 396 is controlled by piston and cylinder devices 415 and 416 respectively, similar to those illustrated at 50 and 51 in FIGS. 1 to 6. The device 415 is pivotally connected to the pump swashplate as at 417 and pivotally mounted on a hollow shaft 418 as at 419 (FIG. 11). The device 416 is pivotally connected to the motor swashplate as at 421 and pivotally connected by yoke arms to the shaft 418 as at 422. Fluid is admitted to the piston and cylinder device 415 through a bore 423 in the shaft 418 and radial ports as at 423. Fluid is admitted to the device 416 through the bore 423 and radial ports 424.

Fluid is bled from the device 415 through a port as at 425 and from the device 416 through a port 426, both controlled by a cam shaped valving plate 42 pivotally mounted as at 428 (FIG. 11). The plate 427 includes a peripheral portion controlling the valving port 425 and formed with a mid-portion 430 for effecting adjustment of the swashplate 382 in opposite directions from the neutral position shown on pivotal movement of the cooperative plate 427 in opposite directions from the position shown, and opposite end portions 431 which allow the swashplate 382 to remain in maximum displacement positions while the motor swashplate 396 is adjusted.

The plate 427 also includes a peripheral valving portion cooperating with the port 426 for controlling swashplate 396, including a mid-portion 435 concentric about the pivot axis 428 for holding the swashplate 396 in the maximum displacement position shown during adjustment of the pump swashplate, and opposite end portions 436 eccentric to the pivot axis for adjusting the motor swashplate to a minimum displacement position while the pump swashplate is held stationary.

Controlled fluid under pressure is admitted to the bore 423 in the shaft 418 by means of a makeup pump 438 mounted in the casing 375 to draw fluid therefrom. The makeup pump is driven by a gear 439 associated therewith and in mesh with a gear 440 on the pump drive shaft 379. The makeup pump delivers fluid through a conduit 442 intersecting the bore 423 as at 443 (FIG. 11).

The makeup pump 438 also supplies makeup fluid to the closed hydraulic circuit connecting the pump and motor, by means of a conduit 445 leading from the bore 418 and communicating with a manifold chamber 446 communicating separately with a pair of spring biased makeup inlet check valves 447 communicating respectively with the arcuate ports 387 and 388, as through passages 448. It will be understood that fluid pressure in the high pressure port of the two ports 387 and 388 acts behind one check valve as through a passage 449 to hold one check valve closed while makeup fluid under pressure opens the other valve to supply makeup fluid to the low pressure side of the circuit.

Makeup fluid is supplied in quantities in excess of makeup requirements for cooling purposes, as in FIG. 1, in order to cause the discharge of heated fluid over a shuttle valve 450 (FIG. 12) and a low pressure relief valve 451 (FIG. 10). Referring to FIG. 11, the arcuate ports 387 and 388 communicate respectively with passages 452 and 453, and these passages communicate respectively with bores as at 454 and 455 (FIGS. 10 and 12) which lead respectively to annular grooves 456 and 457 in a bore 459 housing shuttle valve member 450. Branch passages 461 and 462 lead respectively from the bores 454 and 455 to opposite ends of the valve member 450 so that fluid in the high pressure side of the circuit shifts the valve member 450 to connect the low pressure side to a passage 464 leading to the relief valve 451. Fluid discharged through the relief valve 451 flows to a passage 465 (FIG. 10) which may connect with branch lines leading to cooling loops and spray heads (not shown) similar to that illustrated in FIG. 1.

High pressure surges in the system are discharged from the high pressure side to the low pressure side through high pressure relief valves as at 466.

Pivotal movement of the plate 427 controlling the piston and cylinder devices 415 and 416 is provided by means of a link 468 (FIG. 10) pivotally connected to the plate 427 and pivotally connected to a depending arm 469 on a rod 470 slidably mounted in the housing 375 and adapted for connection with a suitable manually operable handle means not illustrated.

We claim:

1. In a hydaulic transmission, a pump, a motor, conduit means connecting the pump outlet to the motor inlet, means for varying the displacement of the pump, means for varying the displacement of the motor, selectively operable means for placing the displacement varying means of the pump in a maximum displacement position and the displacement varying means of the motor in a minimum displacement position thereby to operate the transmission at full speed, and means responsive to increased load on the transmission and controlling both displacement varying means to first increase the displacement of the motor to increase the torque and then, if the increased load is not overcome, reduce displacement of the pump.

2. In a hydraulic transmission, a variable displacement pump, a variable displacement motor, conduit means connecting the pump outlet and the motor inlet, selectively operable means for increasing pump displacement and decreasing motor displacement to obtain a high speed output, and an override control controlling the pump and the motor and responsive to pressure increase in said conduit means due to increased load on the transmission for first increasing motor displacement to overcome the increased load and then reducing pump displacement if the increased load is not overcome.

3. In a hydraulic transmission, a pump, a motor, conduit means connecting the pump outlet and the motor inlet, fluid operable means for varying the displacement of the pump, fluid operable means for varying the displacement of the motor, manually operable means controlling said fluid operable means to increase pump displacement and reduce motor displacement to obtain high speed operation of the transmission, a fluid operable servo motor for overriding the manually operable means, and valve means responsive to pressure increase in said conduit means due to increased load on the transmission for admitting fluid to said servo motor to first increase motor displacement to overcome the increased load and then reduce pump displacement in the event the increased load is not overcome.

4. In a hydrostatic transmission, a pump, a motor, first conduit means connecting the pump outlet and the motor inlet, second conduit means connecting the motor outlet and the pump inlet, first fluid operable means for varying the displacement of the pump, second fluid operable means for varying the displacement of the motor, manually selectively operable means for controlling said fluid operable means to increase pump displacement and decrease motor displacement to obtain high speed operation of the transmission, including a handle, a link controlling said fluid operable means, and a normally rigid piston and cylinder device interconnecting the handle and link; and an override control including valve means responsive to pressure increase in said first conduit means due to increased load on the transmission for admitting control fluid to said cylinder to relatively move the piston and cylinder to first increase motor displacement and then reduce pump displacement.

5. In a hydrostatic transmission, a reversible variable displacement swashplate pump, a variable displacement swashplate motor, conduits respectively connecting the pump outlet to the motor inlet and the motor outlet to the pump inlet, fluid operable means connected to the pump swashplate for varying the swashplate angle in opposite directions from a neutral position to operate the motor forwardly or reversely, fluid operable means connected to the motor swashplate for varying the swashplate angle to vary the motor torque, manually operable means controlling said fluid operable means for increasing pump displacement and decreasing motor displacement to operate the transmission at high speeed, including a manually accessible handle, a link controlling said fluid operable means, a piston and cylinder device connecting the handle and the link, and spring means normally maintaining the piston fixed in the cylinder on movement of the handle; and a pressure responsive override control including a pair of pressure responsive valves, one communicating with each conduit, responsive to pressure increase in the high pressure conduit due to increased load for admitting control fluid under pressure to said cylinder to relatively move the piston and cylinder to increase motor displacement and then reduce pump displacement.

6. In a hydraulic transmission, a variable displacement pump, a variable displacement motor, conduit means connecting the pump outlet and the motor inlet, a servo motor connected to increase pump displacement and decrease motor displacement to obtain high speed operation of the transmission, manually operable valve means controlling said servo motor to bring the transmission up to speed, and an override control including valve means responsive to pressure increase in said conduit means due to increased load on the transmission for admitting control fluid to said servo motor to first increase motor displacement and then reduce pump displacement.

7. In a hydrostatic transmission, a reversible variable displacement swashplate pump, a variable displacement swashplate motor, conduits respectively connecting the pump outlet to the motor inlet and the motor outlet to the pump inlet, a servo motor operatively connected to the pump swashplate and the motor swashplate for increasing pump displacement and decreasing motor displacement to operate the transmission at high speed, reversible manually operable valve means for controlling the servo motor to bring the transmission up to speed, and a pressure responsive override control including a pair of pressure responsive valve means, one communicating with each conduit connecting the pump and motor, responsive to pressure increase in the high pressure conduit due to increased load, for controlling said servo motor to increase motor displacement to overcome the increased load and then reduce pump displacement if the load is not overcome.

8. In a hydraulic transmission, a variable displacement pump, a variable displacement motor, conduit means interconnecting the pump and the motor so that the pump supplies fluid to operate the motor, selectively operable means for increasing pump displacement and decreasing motor displacement to bring the transmission up to speed, and an override control responsive to increase in pressure in said conduit means due to rapid movement of said selectively operable means for controlling the pump and motor to vary the displacement thereof and bring the transmission up to speed at a controlled rate maintaining constant the pressure in said conduit means.

9. In a hydraulic transmission, a variable displacement pump, a variable displacement motor, conduit means connecting the pump outlet and the motor inlet, a control operatively associated with the pump and motor to first increase pump displacement and then decrease motor displacement to bring the transmission up to speed, manually operable means for operating said control including a handle, a link connected to said control, and a normally rigid piston and cylinder device interconnecting the handle and link; and an override including valve means responsive to pressure increase in said conduit means above a predetermined value due to rapid movement of said manually operable means for admitting control fluid to said cylinder to relatively move the piston and cylinder and thereby move said control to bring the transmission up to speed at a controlled rate so that pressure in said conduit means does not exceed said predetermined value.

10. In a hydrostatic transmission, a reversible variable displacement swashplate pump, a variable displacement swashplate motor, conduits respectively connecting the pump outlet to the motor inlet and the motor outlet to the pump inlet, fluid operable means connected to the pump swashplate for varying the swashplate angle in opposite directions from a neutral position to operate the motor forwardly or reversely, fluid operable means connected to the motor swashplate for varying the swashplate angle to vary the motor torque, a control associated with both fluid operable means to first increase pump displacement and then reduce motor displacement to bring the transmission up to speed, manual means for operating said control, including a handle, a link connected to said control, a piston and cylinder device connecting the handle and the link, and spring means normally maintaining the piston fixed in the cylinder on movement of the handle; and a pressure responsive override including a pair of pressure responsive valves, one communicating with each conduit, responsive to pressure increase in the high pressure conduit due to rapid movement of the manual means for admitting control fluid under pressure to said cylinder to relatively move the piston and cylinder and thereby move said control to bring the transmission up to speed at a controlled rate to maintain constant the pressure in the high pressure conduit.

11. In a hydraulic transmission, a variable displacement pump, a variable displacement motor, conduit means interconnecting the pump and motor so that the pump supplies fluid to operate the motor, a servo motor for increasing pump displacement and decreasing motor displacement to bring the transmission up to speed, manually operable valve means controlling said servo motor, and and override control responsive to increase in pressure in said conduit means due to rapid movement of said manually operable valve means for controlling the servo motor to vary the pump and motor displacement at a controlled rate maintaining constant pressure in said conduit means.

12. In a hydrostatic transmission, a reversible variable displacement swashplate pump, a variable displacement swashplate motor, conduits respectively connecting the pump outlet to the motor inlet and the motor outlet to the pump inlet, a servo motor connected with both swashplates to first increase pump displacement and then reduce motor displacement to bring the transmission up to speed, manually operable valve means controlling said servo motor, and a pressure responsive override including a pair of pressure responsive valve means, one communicating with each conduit connecting the pump and motor, responsive to pressure increase in the high pressure conduit due to rapid movement of the manually operable valve means, for admitting control fluid under pressure to said servo motor to bring the transmission up to speed at a controlled rate maintaining constant pressure in the high pressure conduit.

13. In a hydraulic transmission, a variable displacement pump, a variable displacement motor, first conduit means connecting the pump outlet and the motor inlet, second conduit means connecting the motor outlet and the pump inlet, selectively operable means for increasing motor displacement and reducing pump displacement to reduce the speed of the transmission, and an override control responsive to increase in pressure in said second conduit means above a predetermined value due to rapid movement of said selectively operable means for controlling the pump and motor to vary the displacement thereof and reduce the transmission speed at a controlled rate so that the pressure in said second conduit means does not exceed said predetermined value.

14. In a hydraulic transmission, a variable displacement pump, a variable displacement motor, first conduit means connecting the pump outlet and the motor inlet, second conduit means connecting the motor outlet and the pump inlet, a control operatively associated with the pump and motor to first increase motor displacement and then decrease pump displacement to reduce the speed of the transmission, manually operable means for operating said control including a handle, a link connected to said control, and a normally rigid piston and cylinder device interconnecting the handle and link; and an override including valve means responsive to pressure increase in said second conduit means above a predetermined value due to rapid movement of said manually operable means for admitting control fluid to said cylinder to relatively move the piston and cylinder and thereby move said control to reduce the transmission speed at a controlled rate so that pressure in said second conduit means does not exceed said predetermined value.

15. In a hydrostatic transmission, a reversible variable displacement swashplate pump, a variable displacement swashplate motor, conduits respectively connecting the pump outlet to the motor inlet and the motor outlet to the pump inlet for conducting fluid from the pump to the motor and returning fluid from the motor to the pump, fluid operable means connected to the pump swashplate for varying the swashplate angle in opposite directions from a neutral position to operate the motor forwardly or reversely, fluid operable means connected to the motor swashplate for varying the swashplate angle to vary the motor torque, a control associated with both fluid operable means to first increase motor displacement and then reduce pump displacement to reduce the speed of the transmission, manual means for operating said control, including a handle, a link connected to said control, a piston and cylinder device connecting the handle and the link and spring means normally maintaining the piston fixed in the cylinder; and a pressure responsive override including a pair of pressure responsive valves, one communicating with each conduit, responsive to pressure increased in the return conduit above a predetermined value due to rapid movement of the manual means for admitting control fluid under pressure to said cylinder to relatively move the piston and cylinder and thereby move said control to reduce transmission speed at a controlled rate so that pressure in said return conduit does not exceed said value.

16. In a hydraulic transmission, a variable displacement pump, a variable displacement motor, first conduit means connecting the pump outlet and the motor inlet, second conduit means connecting the motor outlet and pump inlet, a servo motor operatively associated with the pump and motor for increasing motor displacement and reducing pump displacement to reduce the speed of the transmission, manually operable valve means controlling the servo motor to reduce the speed of the transmission, and an override control responsive to increase in pressure in said second conduit means above a predetermined value due to rapid movement of said manually operable valve means for controlling the servo motor to vary the pump and motor displacement at a controlled rate so that pressure in said second conduit means does not exceed said predetermined value.

17. In a hydrostatic transmission, a reversible variable displacement swashplate pump, a variable displacement swashplate motor, conduits respectively connecting the pump outlet to the motor inlet and the motor outlet to the pump inlet for conducting the fluid from the pump to the motor and returning fluid from the motor to the pump, a servo motor operatively connected with both swashplates to first increase motor displacement and then reduce pump displacement to reduce the speed of the transmission, manually operable valve means controlling said servo motor to reduce speed, and a pressure responsive override including a pair of pressure responsive valve means one communicating with each conduit connecting the pump and motor, responsive to pressure increase in the return conduit above a predetermined value due to rapid movement of the manual valve means for controlling said servo motor to reduce transmission speed at a controlled rate so that pressure in said return conduit does not exceed said value.

18. In a hydraulic transmission, a pump, a motor, conduits respectively connecting the pump outlet to the motor inlet and the motor outlet to the pump inlet in a closed circuit, a makeup pump for supplying fluid to the circuit in excess of makeup quantities for cooling purposes, a makeup passage communicating the makeup pump with the low pressure conduit connecting the pump and motor, a relief passage communicating with the low pressure conduit, a relief valve in the relief passage, and valve means normally closing the makeup passage between the makeup pump and the low pressure conduit and normally closing the relief passage between the low pressure conduit and the relief valve and movable by fluid from the makeup pump to open the makeup passage and the relief passage to admit cooling fluid through the makeup passage and discharge heated fluid through the relief passage.

19. In a hydrostatic transmission, a pump, a motor, conduits respectively connecting the pump outlet to the motor inlet and the motor outlet to the pump inlet in a closed circuit, a makeup pump for supplying fluid to the circuit in excess of makeup quantities for cooling purposes, a makeup passage communicating the makeup pump with the low pressure conduit connecting the pump and motor, a separate relief passage communicating with the low pressure conduit, a relief valve in the relief passage, and valve means controlling the makeup passage and the relief passage including a valve member normally closing the makeup passage between the makeup pump and the low pressure conduit and normally closing the relief passage between the low pressure conduit and the relief valve, said valve member including a portion exposed to fluid from the makeup pump and being movable thereby to open the makeup passage and the relief passage to admit cooling fluid through the makeup passage and discharge heated fluid through the relief passage.

20. In a hydrostatic transmission, a motor, a reversible pump, conduits connecting the pump and motor in a closed circuit so that the pump may supply fluid to the motor to operate the latter forwardly or reversely, a makeup pump for supplying fluid to the circuit in excess of makeup quantities for cooling purposes, a makeup passage and branch passages communicating the makeup pump respectively with the conduits connecting the pump and motor, a relief valve, a relief passage and branch passages communicating the relief valve respectively with the conduits connecting the pump and motor, and separate valve means normally closing each branch makeup passage and the associated branch relief passage and movable by fluid from the makeup pump to open the branch makeup passage and the branch relief passage associated with the low pressure conduit connecting the pump and motor to admit cooling fluid through the branch makeup passage associated with the low pressure conduit and discharge heated fluid through the branch relief passage associated with the low pressure conduits.

21. In a hydrostatic transmission, a motor, a reversible pump, conduits connecting the pump and motor in a closed circuit so that the pump may supply fluid to opposite sides of the motor to operate the latter either forwardly or reversely, a makeup pump for supplying fluid to the circuit in excess of makeup quantities for cooling purposes, a makeup passage and branch passages communicating the makeup pump respectively with the conduits connecting the pump and motor, a relief valve, a relief passage and branch passages communicating the relief valve respectively with the conduits connecting the pump and motor, and separate valve means controlling each branch makeup passage and the associated branch relief passage, each valve means including a valve member and spring means normally biasing the valve member to a position closing the branch makeup passage between the makeup pump and the associated conduit and normally closing the branch relief passage between the associated conduit and the relief valve, each valve member including a portion exposed to fluid from the makeup pump and being movable thereby to open the branch makeup passage and the branch relief passage associated with the low pressure conduit to admit cooling fluid through the branch makeup passage associated with the low pressure conduit and discharge heated fluid throguh the branch relief passage associated with the low pressure conduit.

22. In a hydrostatic transmission, a reversible pump, a reversible motor, conduits connecting the pump and the motor in a closed hydraulic circuit so that the pump may supply fluid to either side of the motor to operate the latter in either direction, a makeup pump for supplying fluid to the circuit in excess of makeup quantities for cooling purposes, a makeup passage and branch passages communicating the makeup pump respectively with the conduits connecting the pump and motor, a makeup relief valve in the makeup passage between the makeup pump and the branch makeup passages, a heated fluid relief valve, a relief passage and branch passages communicating the heated fluid relief valve respectively with the conduits connecting the pump and motor, a shuttle valve controlling the branch relief passages, spring means normally centering the shuttle valve to block both branch relief passages from the heated fluid relief valve, conduit means exposing opposite ends of the shuttle valve to fluid in the branch relief passages so that pressure in the high pressure conduit connecting the pump and motor moves the shuttle valve to a position connecting the low pressure conduit to the heated fluid relief valve, separate check valves respectively normally closing the branch makeup passages, and conduit means conducting pressure fluid from said conduits connecting the pump and motor to said check valves so that pressure fluid from the high pressure conduit maintains closed the check valve associated therewith and fluid from the makeup pump opens the other check valve to admit cooling fluid to the low pressure conduit while heated fluid is exhausted from the low pressure conduit.

23. In a reversible hydrostatic transmission, a reversible variable displacement swashplate pump, a variable displacement swashplate motor, a cam movable in opposite directions from a neutral center position and having separate portions thereon for independently controlling displacement of the pump and displacement of the motor on movement in either direction from the neutral center position, including a first portion for varying the angle of the pump swashplate in one direction from a minimum displacement position to a maximum displacement position and a second portion for then reducing the angle of the motor swashplate from a maximum displacement position to a minimum displacement position, on movement of the cam in one direction from the neutral center, thereby to bring the transmission up to speed, said cam portions being operative to return the motor swashplate to a maximum displacement position and then return the pump swashplate to the minimum displacement position on return of the cam to the neutral center position, said cam including third and fourth cam portions corresponding respectively to said first and second cam portions for varying the pump swashplate angle reversely and varying the motor swashplate angle as before, to operate the transmission reversely, on movement of the cam in the opposite direction from the neutral center position.

24. In a hydraulic transmission, a variable displacement pump, a variable displacement motor, a first fluid operable piston and cylinder device for varying the displacement of the pump, a second fluid operable piston and cylinder device for varying the displacement of the motor, a valving port associated with each device so that when completely covered the associated piston and cylinder are relatively movable in one direction, when completely uncovered the piston and cylinder are relatively movable in the opposite direction, and when partially covered the piston and cylinder device is stabilized, a pivoted cam plate having separate peripheral valving portions associated respectively with said valving ports, each valving portion being slidable relative to the associated valving port on pivotal movement of the cam to independently control pump displacement and motor displacement, and means for pivoting the cam.

25. In a hydrostatic transmission, a variable displacement swashplate pump, a variable displacement swashplate motor, a first differential piston and cylinder device for varying the angle of the pump swashplate, a second differential piston and cylinder device for varying the angle of the motor swashplate, means for supplying fluid under pressure to opposite ends of both devices, a bleed passage associated with the large end of each device terminating in a valving port such that when completely covered the associated piston and cylinder are relatively movable in one direction, when completely uncovered the piston and cylinder are relativley movable in the opposite direction, and when partially covered the piston and cylinder device is stationary, a pivoted cam shaped plate having separate peripheral valving portions associated respectively with said valving ports and slidable relative to the port on pivotal movement of the cam to independently control the angle of the pump swashplate and the angle of the motor swashplate, and manually operable means for pivoting the cam.

26. A combination as defined in claim 25, wherein the valving portions are arranged to first increase pump displacement and then reduce motor displacement to bring the transmission up to speed on movement of the cam in one direction, and to increase motor displacement and then reduce pump displacement to reduce the speed of the transmission on movement of the cam in the opposite direction.

27. In a differential hydraulic transmission, a swashplate pump, a coaxial swashplate motor, a planetary gear set coaxial with the pump and motor adjacent the motor, a pump drive shaft extending through the pump and the motor, said drive shaft being adapted at the end adjacent the pump for connection with an input power source and having at the opposite end a sun gear in said planetary set fixed thereon for rotation therewith, a motor output shaft concentric with the pump shaft, a ring gear in said planetary set fixed on the motor shaft for rotation therewith, planetary gears meshing with said sun gear and ring gear, a planetary gear carrier including a transmission output shaft coaxial with said gear set, and means for varying the angles of the pump and motor swashplates to vary the speed of the transmission output shaft.

28. In a reversible differential hydraulic transmission, a swashplate pump, a coaxial swashplate motor, a planetary gear set coaxial with the pump and motor adjacent the motor, a pump drive shaft extending through the pump and the motor, said drive shaft being adapted at the end adjacent the pump for connection with an input power source and having at the opposite end a sun gear in said planetary set fixed thereon for rotation therewith, a motor output shaft concentric with the pump shaft, a ring gear in said planetary set fixed on the motor shaft for rotation therewith, planetary gears meshing with said sun gear and ring gear, a planetary gear carrier including a transmission output shaft coaxial with said gear set, means for varying the angle of the pump swashplate in opposite directions from a neutral center position between a minimum displacement position and maximum displacement positions, and means for varying the angle of the motor swashplate between a maximum displacement position and a minimum displacement position, whereby to vary the speed of the transmission output shaft infinitely between minimum and maximum speeds forwardly and reversely.

29. In a differential hydraulic transmission, a pump, a motor, conduit means interconnecting the pump and motor to that the pump when driven delivers fluid under pressure to drive the motor and the motor returns fluid to the pump, a differential gearing including an input shaft, an output shaft, gearing connecting the input shaft with the output shaft to drive the latter, and a control gear connected with said interconnecting gearing for varying the rate of rotation of the output shaft relative to the input shaft, a drive shaft, gearing connecting the drive shaft to drive the pump and to drive said input shaft simultaneously, gearing connecting the motor to drive the control gear, and means for varying the displacement of the pump to vary the speed of the output shaft.

30. In a hydraulic transmission, a pump device, a motor device, conduit means connecting the outlet of the pump device to the inlet of the motor device so that the pump delivers fluid under pressure to drive the motor device, means for varying the displacement of one device relative to the other to vary the transmission ratio, a fluid operable piston and cylinder means including piston and cylinder elements, one movable and connected to the displacement varying means for operating the latter, a valving port associated with the cylinder element for controlling the flow of control fluid under pressure relative to the cylinder element thereby to control movement of the displacement varying means in opposite directions, a generally flat valve plate movable in opposite directions in a predetermined path and having a valving edge portion thereon slidable relative to said valving port and extending generally in the direction of movement of the valve plate but varying from a line parallel to such movement so that on movement of the valve plate the valving edge portion varies the opening of the valving port thereby to control the displacement varying means.

31. A combination as defined in claim 30, wherein the movement of the valve plate is generally transverse to the relative movement of the piston and cylinder elements, and including a guide groove in the valve plate parallel to said valving edge portion, and a pin on the movable element disposed in said groove.

32. A combination as defined in claim 31, including a manually operable handle for said valve plate, and means yieldably connecting said valve plate and said handle.

33. A combination as defined in claim 30 wherein said valve plate is pivotally mounted for movement in opposite directions about a pivot axis and has a valving edge portion thereon slidable relative to said valving port and extending generally in the direction of movement of the valve plate but varying from a line concentric about the pivot axis so that on movement of the valve plate the valving edge portion varies the opening of the valving port thereby to control the displacement varying means.

34. A combination as defined in claim 33 wherein the movement of the valve plate is generally transverse to the relative movement of the piston and cylinder elements, and including a guide groove in the valve plate parallel to said valving edge portion, and a pin on the movable element disposed in said groove.

35. A combination as defined in claim 34, including a manually operable handle for said valve plate, and means yieldably connecting said valve plate and said handle.

36. In a hydraulic transmission, a variable displacement pump, a variable displacement motor, conduit means connecting the pump outlet and the motor inlet so that the pump delivers fluid under pressure to drive the motor, means for varying the displacement of the pump, means for varying the displacement of the motor, fluid operable piston and cylinder devices respectively for operating the displacement varying means, each including a piston and a relatively movable cylinder connected to the associated displacement varying means, each cylinder having a valving port for controlling the flow of control fluid under pressure relative to the cylinder thereby to control movement of the displacement varying means, a valve plate pivotally mounted for movement in opposite directions about a pivot axis and having separate valving edge portions thereon respectively slidable relative to said valving port and extending generally in the direction of movement of the valve plate but varying from a line concentric about the pivot axis so that movement of the valve plate controls the valving ports thereby to control movement of the displacement varying means, guide grooves in the valve plate parallel respectively to said valving edge portions, and pins respectively on the cylinders and disposed respectively in the associated grooves.

37. A combination as defined in claim 36 including a manually operable pivotally mounted handle for said valve plate, and a yieldable link connecting said handle and said valve plate.

38. In a hydraulic transmission, a variable displacement pump, a variable displacement motor, conduit means connecting the pump and the motor so that the pump delivers fluid to drive the motor and the motor returns fluid to the pump, manually controllable means selectively operable in a first mode for increasing pump displacement and decreasing motor displacement to bring the transmission output up to speed, in a second mode for maintaining pump displacement and motor displacement to maintain output speed and torque, and in a third mode for increasing motor displacement and reducing pump displacement to reduce output speed, and an override control responsive to pressure increase in said conduit means above a predetermined value during operation in each of said modes for overriding the manually controllable means and controlling displacement of the pump and motor to compensate for the pressure increase.

39. In a hydraulic transmission, a variable displacement pump, a variable displacement motor, conduit means connecting the pump and the motor so that the pump delivers fluid to drive the motor and the motor returns fluid to the pump, servo means selectively operable in a first mode for increasing pump displacement and decreasing motor displacement to bring the transmission output up to speed, in a second mode for maintaining pump displacement and motor displacement to maintain output speed and torque, and in a third mode for increasing motor displacement and reducing pump displacement to reduce output speed, a manually operable handle and resilient means connecting the handle for operating the servo means in each of said modes, and an override control responsive to pressure increase in said conduit means above a predetermined value during operation in one of said modes for controlling the servo means to override the manually operable handle and control displacement of the pump and motor to compensate for the pressure increase while the resilient means yields so that the handle remains as positioned 40. In a hydraulic transmission, a variable displacement pump, a variable displacement motor, conduit means connecting the pump and the motor so that the pump delivers fluid to drive the motor and the motor returns fluid to the pump, servo means selectively operable in a first mode for increasing pump displacement and decreasing motor displacement to bring the transmission output up to speed, in a second mode for maintaining pump displacement and motor displacement to maintain output speed and torque, and in a third mode for increasing motor displacement and reducing pump displacement to reduce output speed, a manually operable handle and resilient means connecting the handle for operating the servo means in each of said modes, and an override control responsive to pressure increase in said conduit means above a predetermined value during operation in each of said modes for controlling the servo means to override the manually operable handle and control displacement of the pump and motor to compensate for the pressure increase while the resilient means yields so that the handle remains as positioned.

41. A combination as defined in claim 39 wherein said override control comprises means responsive to pressure increase in said conduit means due to rapid movement of said handle during operation in said first mode for controlling said servo means to increase pump displacement and decrease motor displacement at a controlled rate.

42. A combination as defined in claim 39 wherein said override control comprises means responsive to pressure increase in said conduit means due to increased load on the transmission during operation in said second mode for controlling said servo means to first increase displacement of the motor to increase torque and then, if the increased load is not overcome, reduce displacement of the pump.

43. A combination as defined in claim 39 wherein said override control comprises means responsive to pressure increase in said conduit means due to rapid movement of said handle during operation in said third mode for controlling said servo means to increase motor displacement and reduce pump displacement at a controlled rate.

44. A combination as defined in claim 39 wherein said override control comprises means responsive to pressure increase in said conduit means due to rapid movement of said handle during operation in said first mode for controlling said servo means to increase pump displacement and decrease motor displacement at a controlled rate and means responsive to pressure increase in said conduit means due to increased load on the transmission during operation in said second mode for controlling said servo means to first increase displacement of the motor to increase torque and then, if the increased load is not overcome, reduce displacement of the pump.

45. A combination as defined in claim 39 wherein said override control comprises means responsive to pressure increase in said conduit means due to rapid movement of said handle during operation in said first mode for controlling said servo means to increase pump displacement and decrease motor displacement at a controlled rate, and means responsive to pressure increase in said conduit means due to rapid movement of said handle during operation in said third mode for controlling said servo means to increase motor displacement and reduce pump displacement at a controlled rate.

46. A combination as defined in claim 39 wherein said override control comprises means responsive to pressure increase in said conduit means due to increased load on the transmission during operation in said second mode for controlling said servo means to first increase displacement of the motor to increase torque and then, if the increased load is not overcome, reduce displacement of the pump, and means responsive to pressure increase in said conduit means due to rapid movement of said handle during operation in said third mode for controlling said servo means to increase motor displacement and reduce pump displacement at a controlled rate.

47. A combination as defined in claim 38 wherein said override control comprises means responsive to pressure increase in said conduit means due to rapid movement of said manually controllable means during operation in said first mode for increasing pump displacement and decreasing motor displacement at a controlled rate, means responsive to pressure increase in said conduit means due to increased load on the transmission during operation in said second mode for first increasing motor displacement to increase torque and then, if the increased load is not overcome, reduce pump displacement, and means responsive to pressure increase in said conduit means due to rapid movement of said manually controllable means in said third mode for increasing motor displacement and reducing pump displacement at a controlled rate.

References Cited in the file of this patent

UNITED STATES PATENTS

| | | |
|---|---|---|
| 1,407,047 | Trowbridge | Feb. 21, 1922 |
| 2,516,662 | Vickers et al. | July 25, 1950 |
| 2,896,411 | Bowers et al. | July 28, 1959 |
| 2,905,150 | Ebert | Sept. 22, 1959 |
| 3,003,309 | Bowers et al. | Oct. 10, 1961 |
| 3,074,296 | Ebert | Jan. 22, 1963 |

FOREIGN PATENTS

| | | |
|---|---|---|
| 257,338 | Great Britain | Aug. 30, 1926 |